United States Patent [19]

Longo

[11] Patent Number: 4,551,611
[45] Date of Patent: Nov. 5, 1985

[54] ESPRESSO COFFEE MACHINE CONTROL SYSTEM DISPLAYING BOILER TEMPERATURE AND PRESSURE

[75] Inventor: Walter G. Longo, Milan, Italy

[73] Assignee: Nuova Faema S.p.A., Milan, Italy

[21] Appl. No.: 598,686

[22] Filed: Apr. 10, 1984

[30] Foreign Application Priority Data

Apr. 14, 1983 [IT] Italy .............................. 21543/83[U]

[51] Int. Cl.[4] ........................ H05B 1/02; A47J 31/30; A47J 31/56; F24H 1/20
[52] U.S. Cl. ...................................... 219/308; 99/281; 99/285; 99/293; 99/302 R; 219/272; 219/297; 219/331; 219/506
[58] Field of Search ............... 219/308, 328, 331, 506, 219/330, 297, 271–276; 99/279, 281, 302 R, 302 P, 302 C, 282, 293, 300, 285

[56] References Cited

U.S. PATENT DOCUMENTS 3,278,087 10/1966 Stasse ................................. 99/302 R
4,167,663 9/1979 Granzow et al. ............... 219/330 X

FOREIGN PATENT DOCUMENTS 1274763 8/1968 Fed. Rep. of Germany ...... 219/331
2503183 8/1976 Fed. Rep. of Germany ...... 219/331

Primary Examiner—Anthony Bartis
Attorney, Agent, or Firm—Birch, Stewart, Kolasch & Birch

[57] ABSTRACT

An espresso coffee machine having a boiler provided with an electric resistance heater is fitted with a temperature transducer of the negative temperature coefficient (NTC) resistance type producing an output signal indicative of the boiler temperature. A comparator unit is fed the output signal and compares the signal with the extreme values of a temperature range to control activation and deactivation of the heater. A first display device fed by the output signal continuously displays the boiler water temperature. The output signal is also continuously fed to a memory and processing unit having stored therein the Mollier diagram curve relating to saturated vapor. The memory and processing unit continuously outputs the value of the corresponding water vapor pressure in the boiler, which value is displayed by a second display device.

1 Claim, 1 Drawing Figure

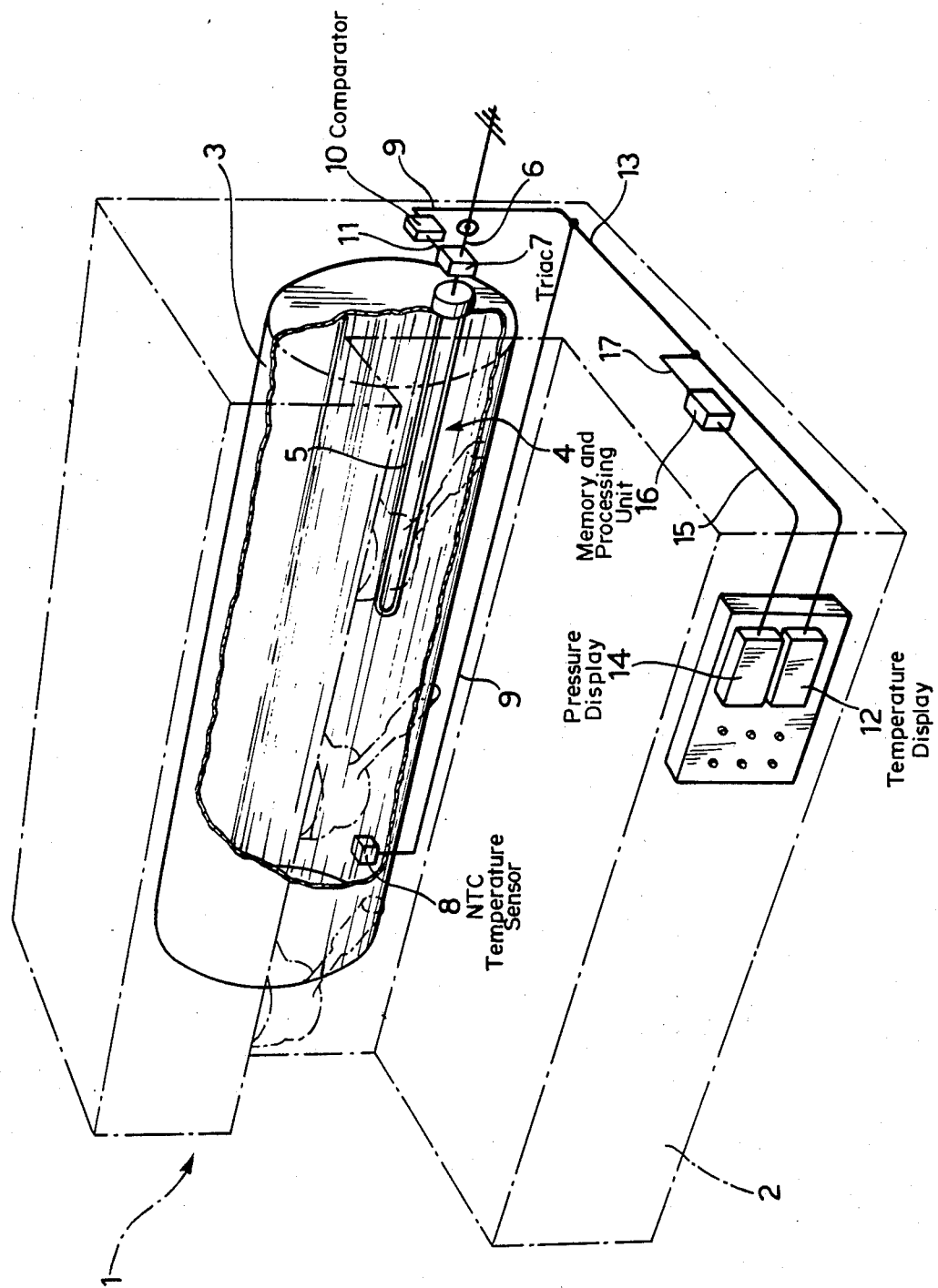

ESPRESSO COFFEE MACHINE CONTROL SYSTEM DISPLAYING BOILER TEMPERATURE AND PRESSURE

The present invention relates to an espresso coffee machine of the type having a boiler associated with means for heating the water contained in this boiler.

It is known that in order to obtain espresso coffee in large quantities with a fine degree of taste and fragrance, it is most important that the water should be at a predetermined temperature selected in accordance with the quality of the coffee and local taste.

In coffee machines of known type, according to an embodiment commonly in use, the water in the boiler is heated by means of an electric resistance the supply to which is controlled by a switch activated by a plate subjected to the pressure of the steam contained in the boiler, and which opens and closes the contacts of the switch in dependence upon the pressure in the boiler.

Although satisfactory in many ways, this method still fails to offer a high degree of control precision and lacks reliability.

The present invention aims to provide an espresso coffee machine of the type specified, of such structural and working characteristics that the above drawbacks may be overcome.

This object is achieved by an espresso coffee machine of the type specified, characterised in that it comprises a temperature transducer fitted in the boiler to provide an output signal for activating the said heating means. The espresso coffee machine includes a memory and processing unit having stored therein the Mollier diagram curve relating to saturated water vapour, said memory and processing unit being continuously fed with the said temperature output signal to continuously output the value of the corresponding pressure, and display means fed with said pressure value for the display thereof.

This transducer is preferably an NTC type resistance.

Further characteristics and advantages of the espresso coffee machine according to the present invention will appear from the following description of one of its preferred embodiments, given by way of non-limiting example, reference being made to the attached drawing the sole view of which shows diagrammatically a perspective view of an espresso coffee machine according to the invention.

Referring to the drawing, by 1 is shown in its entirety an espresso coffee machine comprising a box-like casing structure 2 within which is housed a boiler 3 containing water and steam.

In order to heat the water the boiler is associated with heating means, shown generally by 4.

According to a preferred, but not exclusive, embodiment the heating means 4 comprise an electrical resistance 5, of conventional type, fixed to the boiler 3 and supplied by an electrical line 6 in which is located a static type relay switch 7, preferably a triac.

The machine 1 also includes a temperature transducer 8 fitted in the boiler in a position immersed in the water, which provides an output signal for activating the heating means 4.

In particular the transducer 8 is an NTC (negative temperature coefficient) type resistance, that is of the type in which a temperature increase causes a reduction in electrical resistance.

The transducer 8 provides an output signal related to the water temperature which is fed via a line 9 to a comparator unit 10.

The comparator unit 10 is supplied initially with the extreme values of a temperature range within which the desired temperature of the water in the boiler is to fall, and continuously compares the temperature signal emitted by the transducer 8 with these extreme values.

The comparator unit 10 is connected to the triac 7 via a line 11 to energise or de-energise the resistance 5 when the signal emitted by the transducer 8 coincides respectively with the lowest or highest of the extreme values of the said temperature range.

The machine 1 also comprises a display device 12 mounted on the front of the casing structure 2 and connected via a line 13 and the line 9 to the transducer 8. The display device 12 receives the output signal of the transducer 8 and displays the value of the temperature of the water in the boiler.

The machine 1 also includes a display device 14 mounted on the front of the casing structure and connected via a line 15 to a memory and processing unit 16 which in turn is connected, via a line 17, the line 13 and the line 9, to the transducer 8.

Stored within the memory and processing unit 16 is the Mollier diagram curve relating to saturated water vapour and continuously fed with the temperature signal emitted by the transducer 8.

Unit 16 receives this signal and, in accordance with the Mollier diagram curve, computes the pressure value corresponding to the input temperature value: this pressure value is fed to the display device 14 which displays it.

In the machine 1 according to the invention a hitherto unattained precision and reliability is achieved in the regulation of the water temperature within the boiler.

The machine according to the invention moreover enables an immediate appraisal of its operating conditions at all times, thanks to the display of the temperature and pressure obtaining in the boiler.

The elimination of moving parts, such as those typically present in traditional pressure-measuring manometers, results in the machine according to the invention being free from wear and breakage, and makes for constancy in performance.

It will be apparent that in order to satisfy specific contingency needs, a technician in this field could devise many modifications and variants in the above-described machine, all of which would, however, fall within the scope of the invention as defined in the following claims.

What is claimed is:

1. In an espresso coffee machine of the type having a boiler and heating means associated with the boiler for heating the water contained in the boiler, the improvement comprising a temperature transducer fitted within the boiler and providing a temperature output signal, said transducer being a negative temperature coefficient type (NTC) resistance, activating means responsive to said output signal for activating said heating means, said means for activating the heating means including a comparator unit fed by the said temperature output signal and with the extreme values of a temperature range, to compare said signal with these extremes, said comparator unit controlling activation and deactivation of said heating means, display means fed by said signal to continuously display the temperature of the water in the boiler,
a memory and processing unit having stored therein the Mollier diagram curve relating to saturated water vapour, said memory and processing unit being continuously fed with the said temperature output signal to continuously output the value of the corresponding pressure, and
display means fed with said pressure value for the display thereof.

* * * * *